No. 618,101. Patented Jan. 24, 1899.
W. T. KAMMANN.
POWER TRANSMISSION DEVICE.
(Application filed Dec. 17, 1896.)
(No Model.) 3 Sheets—Sheet 2.

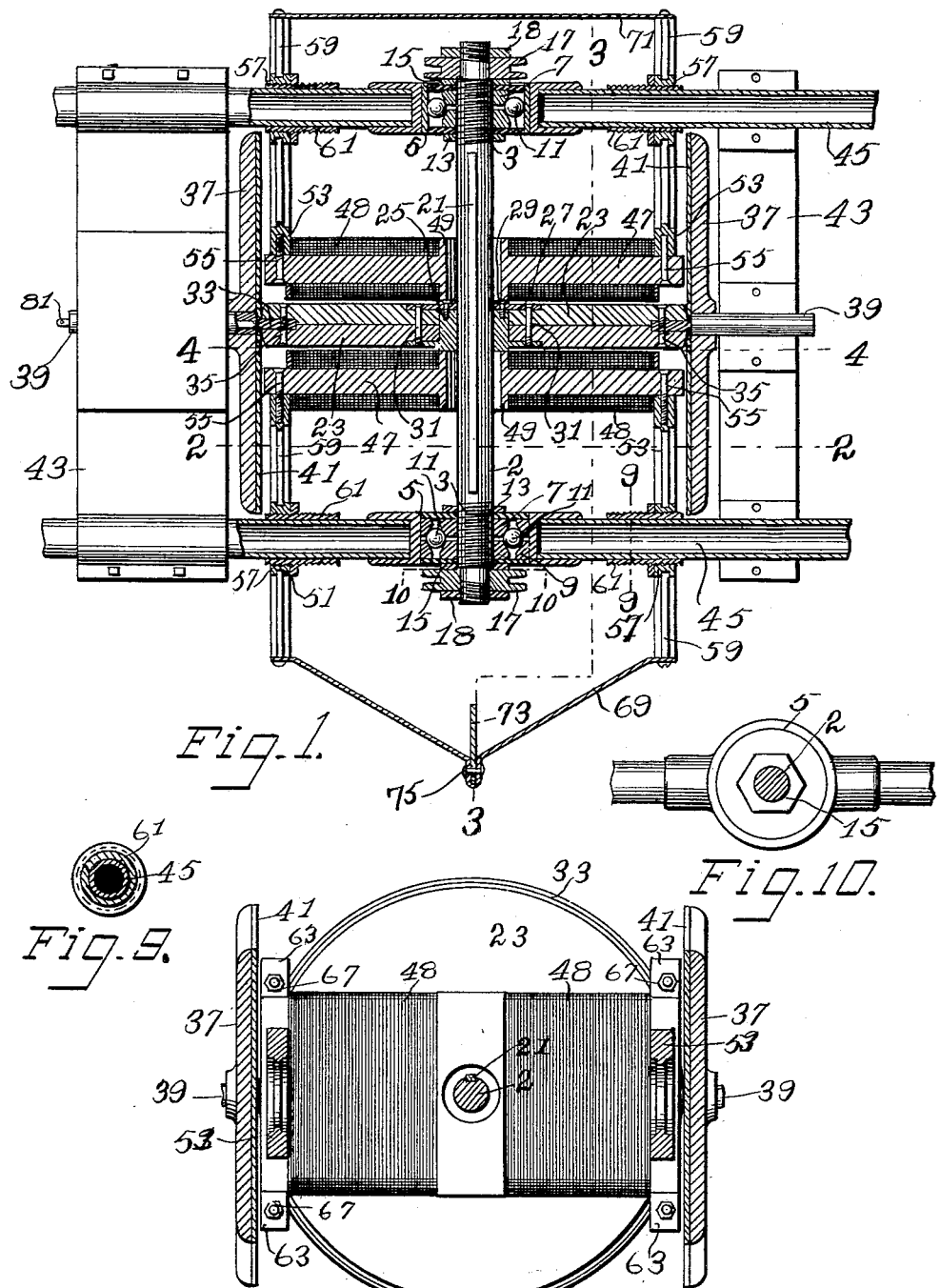

Witnesses
B. P. Shepherd,
W. E. Gooley

Inventor
William T. Kammann
By Paul O. Hawley
his attorneys

THE NORRIS PETERS CO., PHOTO-LITHO., WASHINGTON, D. C.

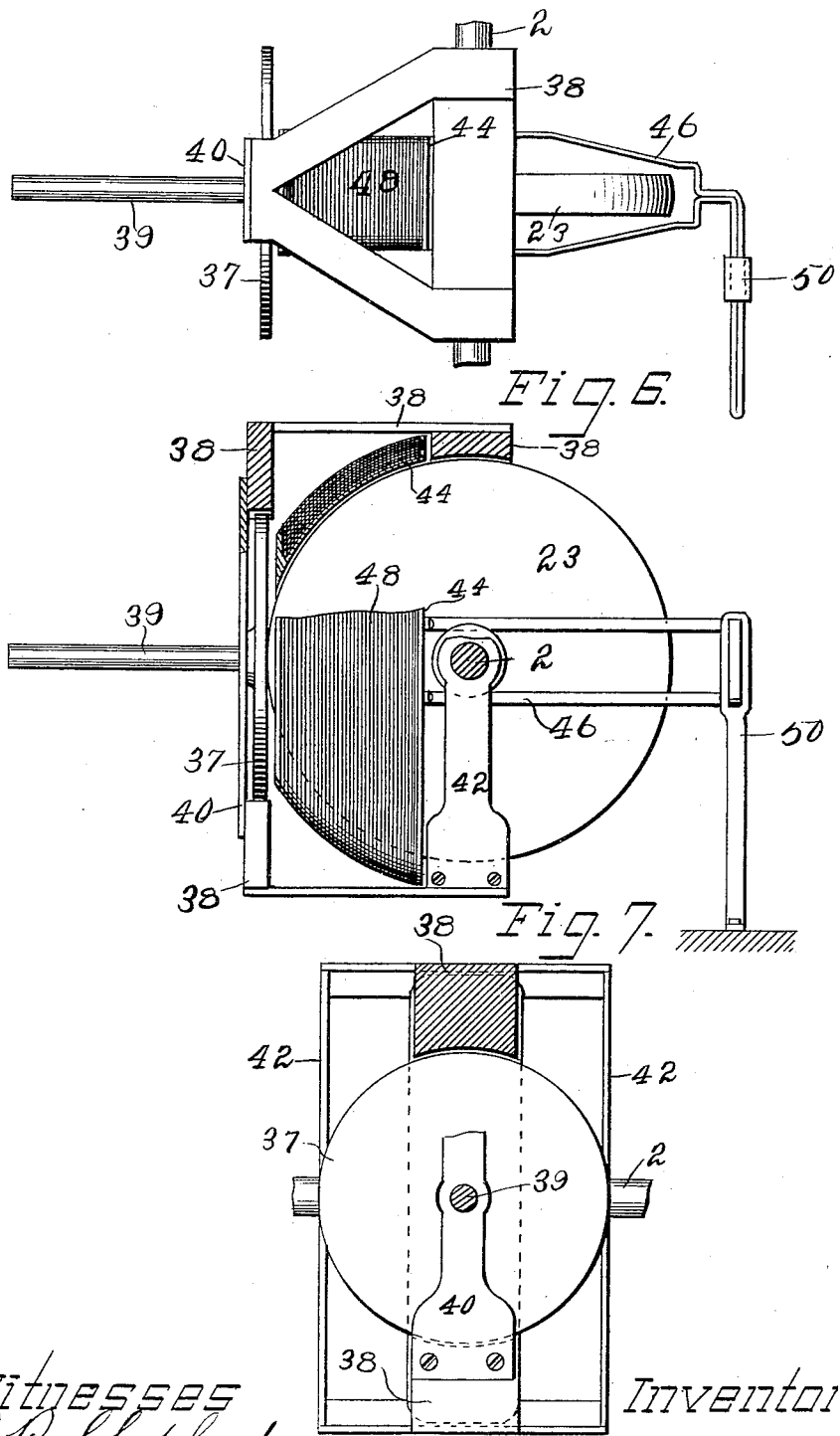

UNITED STATES PATENT OFFICE.

WILLIAM T. KAMMANN, OF MINNEAPOLIS, MINNESOTA, ASSIGNOR TO THE KAMMANN ELECTRIC COMPANY, OF SAME PLACE.

POWER-TRANSMISSION DEVICE.

SPECIFICATION forming part of Letters Patent No. 618,101, dated January 24, 1899.

Application filed December 17, 1896. Serial No. 615,977. (No model.)

*To all whom it may concern:*

Be it known that I, WILLIAM T. KAMMANN, of the city of Minneapolis, county of Hennepin, State of Minnesota, have invented certain new and useful Improvements in Power-Transmission Devices, of which the following is a specification.

This invention relates to power-transmission devices designed especially for use with motor-cycles or any power-driven vehicles; and the objects I have in view are to provide means whereby with a motor that is constantly driven in one direction the carriage or vehicle may be driven in either direction and at any desired rate of speed or in which, without stopping the motor, the carriage or vehicle may be stopped and in which the stopping and starting may be accomplished gradually and without any sudden jerks or jars of the vehicle.

Another object of the invention is to provide means whereby the bearings of the friction or driving disks will not be put under pressure, so that the friction of the power-transmitting device remains low and the efficiency high.

Other objects of the invention will appear from the following detailed description, taken in connection with the accompanying drawings, in which—

Figure 3:
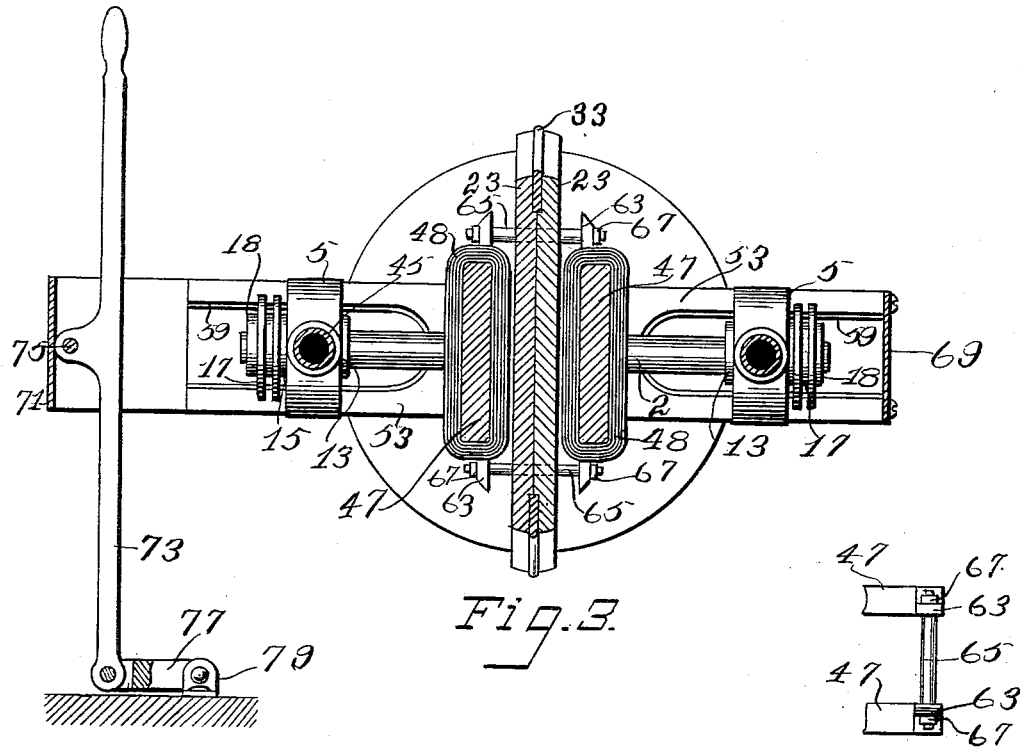
Figure 11:
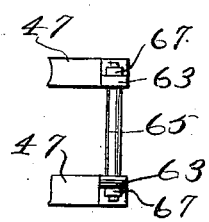
Figure 4:
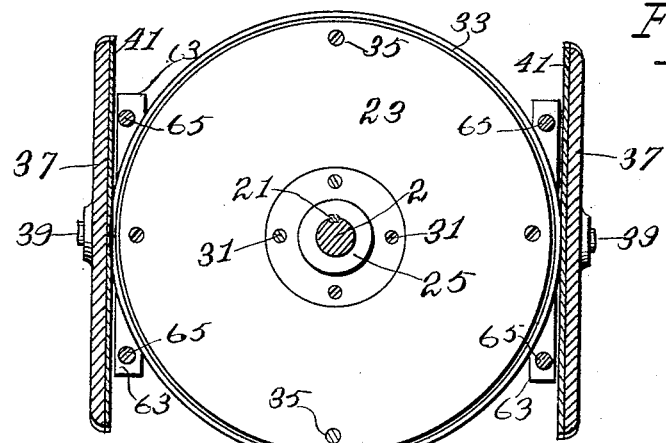
Figure 5:
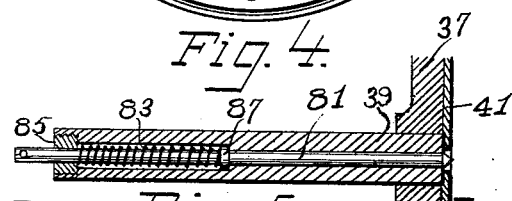

Figure 1 is a plan section of my improved power-transmitting device. Fig. 2 is a vertical section on line 2 2 of Fig. 1. Fig. 3 is a similar section on line 3 3 of Fig. 1. Fig. 4 is a similar section on line 4 4 of Fig. 1. Fig. 5 is a detail of pin for operating the switch controlling the energizing-coils of the magnets. Figs. 6, 7, and 8 are details of the modified construction. Fig. 9 is a detail section on line 9 9 of Fig. 1. Fig. 10 is a side elevation of a portion of the tubular frame, showing the box in which one end of the main shaft is mounted. Fig. 11 is a detail showing the pole pieces and rods for connecting the cores of the magnet.

In the drawings, 2 represents the main shaft, which is preferably mounted in a frame, the ends of the shaft being preferably supported upon suitable antifriction-bearings, which may be of any suitable or preferred construction. As here shown, each end of the shaft is provided with a screw-thread 3, which is arranged within a box 5, and suitable bearing-rings 7 9 are screwed onto the ends of said shaft in position to come within said box. One of said boxes is preferably provided with rings 9, and between said rings and the rings 7 are arranged a series of balls 11. The rings 9 may be used in the other box also, although I prefer to omit them in this box, and in this instance the balls 11 will be arranged between the rings 7 and the inner surface of the box, which may, however, be provided with a suitable ring or hardened lining 9'. (See Fig. 1.) By using the ring or lining 9' I provide for longitudinal adjustment of the antifriction devices at one end of the said cap. Collars 13 and 15 are preferably arranged upon the shaft 2 at both sides of each box 5, and upon one or both ends of the shaft 2 I secure a suitable sprocket-wheel 17. Suitable jam-nuts 18 may be arranged upon said shaft outside of the sprocket-wheels 17. The shaft 2 is preferably provided with a longitudinal key or spline 21, and upon this shaft is arranged a disk, which I call the "transmission element." This disk turns with the shaft 2, but is free to slide thereon. Any suitable construction of disk may be employed. I prefer to form this disk of two circular plates 23, that are secured together and to the shaft 2 by means of a flanged hub 25, said hub having a removable plate 27, secured in position by means of suitable screws 29 and forming one flange of the hub. Suitable screws 31 pass through the flanges of said hub and through the disks 23, and thereby secure said disks in place. A metallic or rawhide ring 33 is arranged in a recess between the two disks 23 at their outer edge and is secured in position by suitable screws or other fastenings 35. The edge of the ring 33 preferably projects slightly beyond the edges of the disks 23. Suitable metallic disks 37 are arranged at right angles to the center disk or transmission element. The disks 37 are mounted upon suitable shafts 39, and a suitable motor of any preferred kind may be secured to or connected with either or both of said shafts. Each of the disks 37 is preferably provided with a leather or rawhide face 41, and the shafts of said disks are mounted in bearings formed upon or secured to suitable cross-bars 43. The cross-bars 43 are secured to the frame that supports the bearings for the shaft 2 and which also supports the means by which the main disk or transmission element and the magnets hereinafter referred to are moved back and forth along the shaft 2. As here shown, this frame consists of the tubes or bars 45, supporting the cross-bars 43 and having secured to them the boxes 5, which carry the bearings for the main shaft 2. Arranged upon either side of the main disk or transmission element are the cast-steel cores 47, having hubs 49, through which the shaft 2 passes, said cores being of suitable length to extend substantially from the face of one disk 37 to the face of the corresponding disk 37; but said cores do not come in contact with said disk. Suitable coils of magnet-wire 48 are wound upon the cores 47, and when a current of electricity passes through said wires the cores 47 are magnetized, and said cores then attract the disks 37 and draw said disks against the circumference of the center disk or transmission element, the pressure thereby created producing sufficient adhesion to cause said main disk or transmission element to be driven from the other disk or disks 37. As before stated, I may arrange a motor in connection with each of the shafts 39, in which case both of the disks 37 will act as a driving-disk, or I may connect a motor to one of said shafts only, in which case one of said disks will act as a driving-disk, while the other will become an idler and will serve simply to complete the magnetic circuit and to equalize the pressure upon said main disk or transmission element, and thereby prevent any pressure upon the bearings of the main shaft.

The cores 47 are supported by means of a suitable frame 51, that is arranged to slide transversely upon the main supporting-frame 45. This frame 51 consists, preferably, of the four slotted plates 53, said plates being arranged upon opposite sides of the main disk or transmission element and said cores 47 being secured to said plates by means of suitable screws 55. The plates 53 slide upon the circular grooved bearing-blocks 57, (see Figs. 1 and 9,) said plates being preferably arranged to straddle said bearing-blocks and being provided with ribs 59, which engage the grooves in said blocks. The bearing-blocks 57 are preferably screwed onto the threaded sleeves 61, that are secured by brazing or in any other suitable manner upon the tubes 45, so that by means of said threaded sleeves said blocks may be adjusted longitudinally of said tube by screwing said blocks along said sleeves. The magnet-cores 47 are provided with the vertical projections or pole-pieces 63, (see Figs. 3, 4, and 11,) and the opposite projections are connected by the rods 65, secured to said projections by any suitable means, as the nuts 67. The outer ends of the opposite plates 53 are preferably connected by means of the plates 69 and 71. An operating-lever 73 is preferably connected to the plate 69 by a suitable pivot 75, having its lower end connected to a suitable support. I have here shown a link 77, connecting the lower end of the lever 73 with a stationary support 79. As the main disk or transmission element is arranged between the two cores 47 and as said cores are connected by the means described, it follows that as said frame 51 and said cores are moved transversely of the main or tubular frame said cores and said disk or transmission element will be moved longitudinally on the main shaft 2.

When the main disk or transmission element is in a central position or in line with the axes of the shafts 39, said disk remains stationary, so far as receiving motion from the disks 37 is concerned, even though the disks 37 are rotated. When the main disk or transmission element is at its extreme position in either direction, it will be driven at a maximum speed, and by moving said disk or transmission element from one side of the center of said disks 37 to the other side the direction of movement of said main disk or transmission element is reversed.

It will be seen that the disks 37 complete the magnetic circuit and that by this means any desired pressure can be produced between the disks 37 and the main disk or transmission element without putting any bearings of the device under pressure. The magnetic attraction will cause an adhesion between the disks 37 and the transmission element 35 sufficient to cause said transmission element and the main shaft to be rotated without any slipping of one surface upon the other. Hence the friction of the device will be very low and its efficiency will be high.

In the construction shown in Figs. 1 to 4 the main disk or transmission element can be made of non-magnetic material, and said disk need not form a part of the magnetic circuit.

In Figs. 1 and 5 I have shown the core of one of the shafts 39 provided with a pin or rod 81, extending longitudinally through it and having a conical end projecting through the face of the disk 37. The rear end of said shaft is preferably provided with a socket, within which is arranged a spring 83, that engages at one end a nut 85, screwed into the end of the shaft, and at the other against a collar 87 upon the rod 81. This pin may form the operating-rod of a suitable switch that is arranged in the electric circuit that is partly formed by the coils of wire 48 upon said cores 47. When the main disk or transmission element is moved to a central position or in line with said shafts 39, said switch will be operated and said cores 47 will be demagnetized, and no adhesion will be produced between the surfaces of the disks 37 and the surface of said main disk or transmission element.

In Figs. 6, 7, and 8 I have shown the main disk or transmission element 23 formed of magnetic material and constituting a part of the magnetic circuit by forming the core for the energizing-coil 48. In this instance the main disk is energized and adheres to the surface of the disk 37, that is in contact therewith. I will, in this instance, use but a single driving-disk 37, and to equalize the pressure I provide a metallic frame 38, extending above and below the transmission element and also above and below the driving-disk 37, the two parts of said frame being connected by the metallic plate 40. (See Figs. 7 and 8 and the metallic plates 42 shown in the same figures.) This frame completes the magnetic circuit and enables me to dispense with one of the disks 37. In this instance the wire of the coil 48 is wound upon a thin metallic frame 44, that is secured to the sliding frame 46, the end of said frame being arranged at right angles to the main part thereof (see Fig. 6) and sliding in a slotted standard 50. In this construction the frame 38 remains stationary, while the main disk or transmission element, which, as before stated, in this instance also forms the core of the magnet, and the wire coil are movable longitudinally upon the shaft 2. The mode of operation of this device and the results obtained are substantially the same as with the construction shown in Fig. 1.

I no not wish to be limited to the details of the construction of the device, as I believe myself to be the first to provide an adhesion-transmission device in which the necessary adhesion between the transmitting elements is secured without the introduction of friction upon any of the parts of the device.

Having thus described my invention, I claim as new and desire to secure by Letters Patent—

1. The combination of suitable disks arranged in rolling contact, one of the same being moved across the face of the other, and a suitable magnet adapted to draw one of the disks into contact with the other, substantially as described.

2. The combination, with three disks, one arranged in rolling contact with the others and adapted to move across the faces thereof, having fixed bearings, and being of non-magnetic material, and a magnet, the circuit of which is closed through said other disks, substantially as described.

3. The combination, in a power-transmission device, of a rotary disk, with a second disk arranged to roll on the surface of the first disk and arranged to be moved across the face thereof, and a magnet arranged longitudinally of the diameter of the second disk, the first disk being of magnetic material and through which the circuit of said magnet is closed, as and for the purpose specified.

4. In a power-transmitting device, the combination with suitable disks arranged to engage each other, of suitable electromagnets arranged to hold one of said disks against the other, and a switch for breaking the electric circuit in which said magnets are located when one of said disks is in a central position relatively to the other.

5. The combination, in a power-transmission device, of a pair of disks movable toward one another, with a disk arranged between the said pair of disks and in rolling contact therewith, a frame carrying said disk and movable to shift the same upon the surfaces of the pair of disks, and a magnet so arranged between the pair of disks as to draw said disks into contact with the disk between them, a complete magnetic circuit being established through said magnet and said pair of disks, substantially as described.

6. The combination, of relatively perpendicular disks, in rolling contact, with a magnet having a complete magnetic circuit, closed through at least two of said disks, and whereby one of the same is held in rolling contact with the disk to which it is perpendicularly arranged, and whereby the bearings or supports of said disks are relieved from pressure, substantially as described.

7. The combination, with a disk, provided with fixed bearings, of another disk arranged at right angles thereto, in rolling contact therewith, and being longitudinally movable with respect to its bearings, and a magnet to draw said second disk against the first disk, substantially as described.

8. The combination, with opposite disks having bearings with respect to which both are longitudinally movable, a disk perpendicularly arranged between them and having its axis parallel with the faces thereof, and longitudinally movable upon its axis but having fixed rotary bearings, and a magnet movable with the third disk and having fixed bearings, and whereby said first-mentioned disks are drawn against the disk between them without affecting pressure upon the bearings of either disk, substantially as described.

In testimony whereof I have hereunto set my hand this 14th day of December, A. D. 1896.

WILLIAM T. KAMMANN.

In presence of—
 A. C. PAUL,
 M. E. GOOLEY.